April 21, 1953
R. I. HOAGLIN ET AL
2,636,050
SEPARATION OF METHANOL FROM METHYL ACETATE BY
EXTRACTIVE DISTILLATION WITH ETHYLENE GLYCOL
Filed May 3, 1951
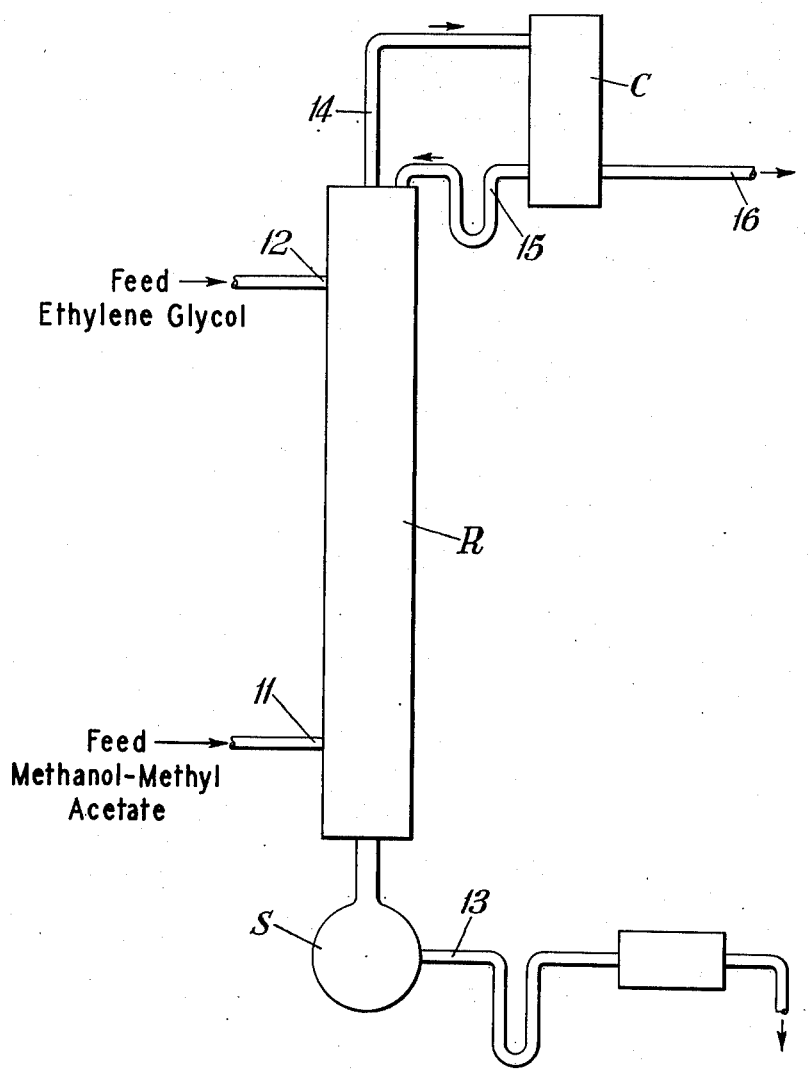
INVENTORS
RAYMOND I. HOAGLIN
WALTER M. FRANKENBERGER, JR.
BY Charles C. Scheffler
ATTORNEY Patented Apr. 21, 1953

2,636,050

UNITED STATES PATENT OFFICE 2,636,050

SEPARATION OF METHANOL FROM METHYL ACETATE BY EXTRACTIVE DISTILLATION WITH ETHYLENE GLYCOL

Raymond I. Hoaglin, South Charleston, and Walter M. Frankenberger, Jr., Charleston, W. Va., assignors to Union Carbide and Carbon Corporation, a corporation of New York Application May 3, 1951, Serial No. 224,284

1 Claim. (Cl. 260—499)

This application relates to procedures for the resolution of mixtures and is more particularly concerned with an improved method for separating methanol and methyl acetate out of mixtures thereof.

Methanol and methyl acetate are not readily separable by simple distillation procedures. Methanol boils at 64.5° C.; methyl acetate at 57.2° C. and together they form an azeotrope which boils at 54° C. It is known that methyl acetate, free of methanol, can be obtained by the reaction of methanol and acetic anhydride. Methanol-free methyl acetate can be obtained also by reaction of acetic anhydride with the methanol of a methanol-methyl acetate constant boiling mixture. Both of these methods are too costly for commercial production, however. Another method of resolving the methanol-methyl acetate constant boiling mixture is by azeotropic distillation in which pentane is a third component. This procedure is slow because pentane distills azeotropically with only a small amount of methanol. An even greater objection is that the use of a material as low-boiling as pentane necessitates the use of brine-cooled condensers or distillation under pressure. The use of pentane also gives rise to a fire hazard.

It is known to separate methanol from acetone by conducting the vapors of the methanol-acetone mixture upwardly through a rectifying column and admitting sodium thiosulfate near the top of the column. (Principles of Chemical Engineering by Walker, Lewis and McAdams; 2d ed., McGraw-Hill, New York, 1927.) Methyl alcohol and acetone have boiling points which differ by less than nine degrees and in addition form a constant boiling mixture. The sodium thiosulfate which is conveniently added as a saturated aqueous solution washes the methyl alcohol down the column while the acetone vapor passes out the top and is condensed. The methyl alcohol in solution is taken out near the bottom of the column and recovered from the sodium thiosulfate by distillation.

The present improvement is based on our discovery that a separation of methanol from methanol-methyl acetate mixtures can be accomplished by introducing ethylene glycol near the top of the rectifying column through which the vapors of the mixture are ascending. The ethylene glycol flows downwardly through the packing and preferentially absorbs the methanol. The methyl acetate freed of the methanol passes out of the column at the top while the methanol is removed from the bottom of the column in solution in ethylene glycol. It is recovered from the ethylene glycol by distillation and the ethylene glycol returned to the rectifying column.

In carrying out the improvement using a rectifying column equivalent to about 23 theoretical plates and a ratio of 2.5 volumes of ethylene glycol to each volume of methanol-methyl acetate constant boiling mixture, it is possible to separate about 99 per cent of the methyl acetate supplied to the column as a distillate of 98 to 99 per cent purity.

For convenience in describing the improvement, reference is had to the accompanying drawing. In this figure are represented diagrammatically, a rectifier, R; a still, S; and a condenser, C. Referring to the drawing, the mixture of methanol and methyl acetate as a liquid is introduced at 11 into the rectifier or column R, in which it comes into contact with heated vapors produced in still S and is itself vaporized. These vapors of methanol and methyl acetate ascend through the column and are brought into absorptive contact with a descending flow of ethylene glycol which is fed into the column R at 12. The ethylene glycol preferentially or selectively absorbs the methanol. The solution of methanol in ethylene glycol thus formed flows from the column near the bottom into the still S. The level of liquid in still S is maintained constant by a continuous overflow device 13 through which a mixture containing about six per cent methanol and 94 per cent ethylene glycol is conducted from the still to equipment not shown for recovery of the methanol therefrom by distillation. The ethylene glycol after it has been freed of methanol can be returned to the column for further absorption of methanol.

The methyl acetate vapor after it has been washed with ethylene glycol is taken off from the column, near the top, by way of conduit 14, to the condenser C where it is condensed to liquid. A part of the liquid condensate is returned to the rectifier R, near the top, through conduit 15, with the remainder flowing to storage through conduit 16.

By selection of the proper ratio of ethylene glycol to the methanol-methyl acetate mixture, a methyl acetate of greatly reduced methanol content can be obtained. For instance, using a rectifying column equivalent to about 23 theoretical plates and a ratio of 2.5 volumes of ethylene glycol for each volume of methanol-methyl acetate constant boiling mixture, it is possible to obtain approximately 99 per cent of the methyl acetate as a distillate or condensate of 98 to 99 per cent purity. The remainder of the impurity can then be readily removed by simple rectification.

The improvement is further illustrated by the following example.

Example

A mixture containing 19.9 per cent methanol and 80.1 per cent methyl acetate was supplied to a rectifying column at a rate of 303 milliliters (271 grams) per hour. The column was an insulated glass tube having an outside diameter of 32 millimeters and a length of 2.45 meters (8 feet). It was packed with glass helices, $\frac{3}{16}$ inch in diameter and possessed the equivalent of 23 theoretical plates. A condensing still head equipped with an automatic liquid divider was attached to the top of the column and a timing mechanism known as the "Flexopulse" timer was employed to control the reflux ratio. By use of this timer, it was possible to vary independently the amount of distillate and the amount of material refluxed. A glass still kettle of one liter capacity equipped with a continuous overflow device to maintain a constant liquid level was provided at the bottom of the column. Heat to the kettle was supplied by a 600 watt electric heater.

The methanol-methyl acetate mixture was supplied to the column at a place 10 inches above the bottom. The ethylene glycol was supplied to the column at a place 12 inches below the top at the rate of 770 milliliters (855 grams) per hour. The column was operated at a reflux ratio of about 7.2 to 1.

Methyl acetate of 98.4 purity (1.6 per cent of methanol, by weight) was collected as a distillate at the rate of 241 milliliters (225 grams) per hour. A mixture containing 94.2 per cent of ethylene glycol, 5.4 per cent of methanol and 0.4 per cent of methyl acetate by weight was removed continuously from the still kettle at the rate of 830 milliliters (907 grams) per hour. Approximately 99 per cent, by weight, of the methyl acetate fed to the column was recovered in the distillate of the stated purity. Methanol and methyl acetate were easily removed from the ethylene glycol kettle product, and the glycol was then ready for reuse in the rectifying column.

We claim:

A process for separating methanol and methyl acetate from mixtures thereof which comprises vaporizing at its boiling temperature the methanol-methyl acetate mixture, passing the vapor mixture into absorptive contact with ethylene glycol in liquid form to form a solution of methanol in ethylene glycol while maintaining the methyl acetate in the vapor state and thereafter removing said solution from absorptive contact with said vapor mixture.

RAYMOND I. HOAGLIN.
WALTER M. FRANKENBERGER, Jr.

References Cited in the file of this patent

UNITED STATES PATENTS

| Number | Name | Date |
|---|---|---|
| 2,251,215 | Tindall | July 29, 1941 |